United States Patent [19]

Niki et al.

[11] 4,118,517

[45] Oct. 3, 1978

[54] METHOD OF PREPARING FISH MEAT POWDER HAVING KAMABOKO-FORMING PROPERTY

[75] Inventors: Hiroshi Niki; Eiki Deya; Toru Doi, all of Sapporo; Seiichiro Igarashi, Tokorozawa; Hiromichi Hayashi, Sapporo, all of Japan

[73] Assignee: Snow Brand Milk Products Co. Ltd., Sapporo, Japan

[21] Appl. No.: 809,919

[22] Filed: Jun. 24, 1977

Related U.S. Application Data

[63] Continuation of Ser. No. 557,997, Mar. 13, 1975, abandoned.

[30] Foreign Application Priority Data

Aug. 2, 1974 [JP] Japan .................... 49-88776

[51] Int. Cl.² .................................. A22C 25/00
[52] U.S. Cl. .................... 426/271; 426/574; 426/643; 426/646; 426/471
[58] Field of Search ........... 426/271, 573, 574, 643, 426/471, 646

[56] References Cited

U.S. PATENT DOCUMENTS

| 2,864,706 | 12/1958 | Stoloff | 426/271 |
|---|---|---|---|
| 3,264,116 | 8/1966 | Gray | 426/643 |
| 3,591,389 | 7/1971 | Schneider | 426/573 X |
| 3,922,372 | 11/1975 | Hasegawa | 426/574 |
| 3,955,011 | 5/1976 | Niki et al. | 426/643 |

FOREIGN PATENT DOCUMENTS 48-48,467 12/1974 Japan.

OTHER PUBLICATIONS

Handbook of Food Additives, Furia, 1968, pp. 289–293.
"Sequesterants in Food", Chemical Rubber Co., Cleveland, 1968.
Handbook of Food Additives, Furia, p. 648, Chemical Rubber Co., Cleveland 1968.

*Primary Examiner*—S. Leon Bashore
*Assistant Examiner*—Steve Alvo
*Attorney, Agent, or Firm*—Lane, Aitken, Dunner & Ziems

[57] ABSTRACT

A method for preparing a fish meat powder capable of forming KAMABOKO is disclosed. The method involves forming a slurry of fish meat in a neutral buffer solution containing divalent metal ions and polyvalent weak-acid anions. The anions are present in an amount sufficient to sequester the metal ions. The slurry is converted to a fish meat powder by spray-drying.

5 Claims, 3 Drawing Figures

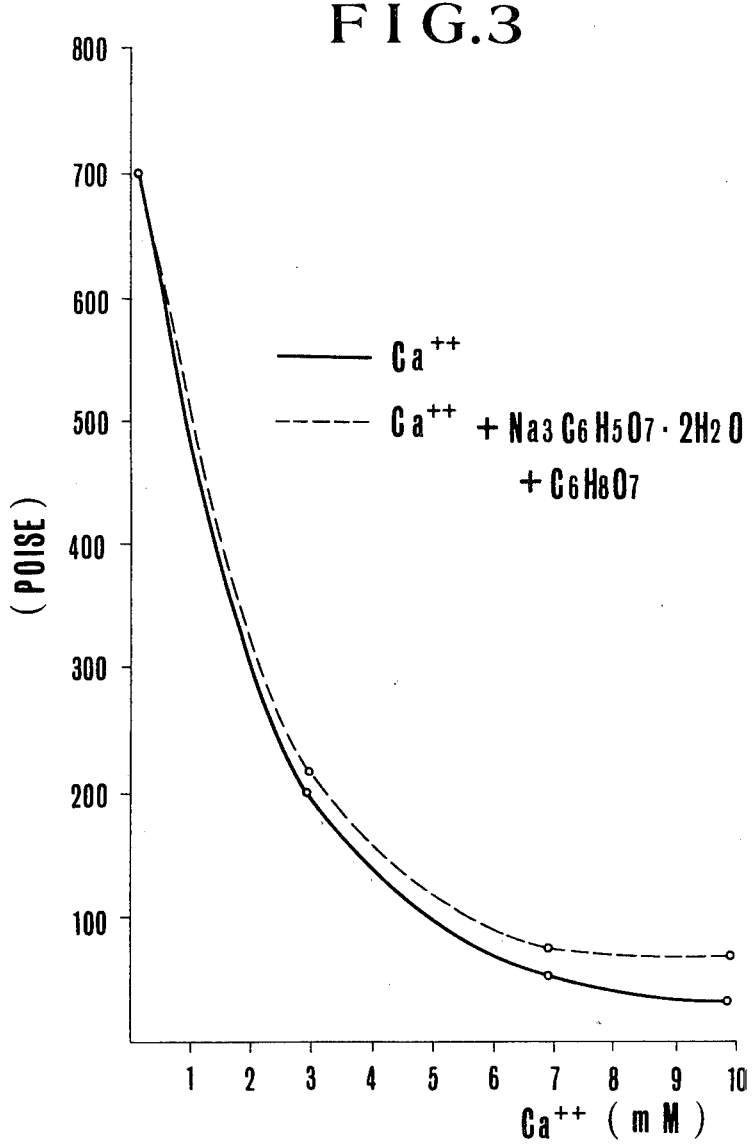

METHOD OF PREPARING FISH MEAT POWDER HAVING KAMABOKO-FORMING PROPERTY

This is a continuation of application Ser. No. 557,997 filed Mar. 13, 1975 and now abandoned.

FIELD OF THE INVENTION

This invention relates to a method of preparing fish meat powder which, on being blended with suitable amounts of water and table salt, exhibits an ability to form KAMABOKO equal to that which is prepared from fresh fish meat.

BACKGROUND OF THE INVENTION

It has recently been proposed to prepare a fish meat powder retaining the KAMABOKO-forming property of fresh fish meat by grinding fresh fish meat in the presence of an oligosaccharide such as sucrose, a polyhydric alcohol such as sorbitol and an aliphatic acid ester and subsequently spray-drying the resultant fish meat slurry.

With this method, however, a problem is encountered in that the fish meat slurry has too high a viscosity for the spray-drying step to be carried out without difficulty.

One modification of the above process involves first finely mincing fresh fish meat or frozen ground fish meat in the presence of divalent metal ions to produce a fish meat slurry, then adjusting the pH value of the fish meat slurry to the neighborhood of neutrality and thereafter, spray-drying the slurry, whereby the viscosity of the fish meat slurry is sufficiently lowered (to about 30 poises) to facilitate the spray-drying and permit the fish meat slurry to be spray-dried without denaturation of the muscular proteins of the fish meat in the slurry (Japanese Patent Application No. SHO 48-48467).

When KAMABOKO or other similar paste products are manufactured from the fish meat powder obtained by the modified method, however, the divalent metal ions, which remain in the powder, must be sequestered and this sequestration requires incorporation of sodium pyrophosphate or other similar sequestrant into the powder, thus limiting the utility and processing of the finally produced fish meat powder.

BRIEF SUMMARY OF THE INVENTION

This invention, therefore, aims to provide a method for the manufacture of a fish meat powder exhibiting the KAMABOKO-forming property of fresh fish meat, which method provides a low viscosity fish meat slurry which facilitates the spray-drying of the slurry and consequently produces a fish meat powder from which KAMABOKO can be produced merely by kneading the fish meat powder in conjunction with suitable amounts of water and table salt without requiring incorporation of sodium pyrophosphate or other similar chemicals into the powder.

It has now been discivered that when fresh or frozen fish meat is ground in the presence of divalent metal ions such as calcium or magnesium ions and of polyvalent weak-acid anions prepared in the form of a buffer solution with a pH value approximating neutrality and incorporated in an amount sufficient for sequestration of the ions, the viscosity of the fish meat slurry is notably lowered to the extent of facilitating the spray-drying of the slurry and, at the same time, the slurry may be spray dried in a thermally stable state due to the adjustment of the pH value thereof to the neighborhood of neutrality after spray-drying, the divalent metal ions mentioned above are allowed to become completely sequestered, with the result that the fish meat powder, which can be easily processed further, possesses KAMABOKO-forming property.

Accordingly, the method of the present invention involves the step of converting fresh fish meat or frozen ground fish meat into the form of a slurry in the presence of divalent metal ions and polyvalent ions of a weak acid prepared in the form of a buffer solution with a pH value approximating neutrality and incorporated in an amount required for sequestering the metal ions. This slurry is subsequently subjected to spray-drying.

BRIEF EXPLANATION OF THE DRAWINGS

FIGS. 1 through 3 illustrate relationships between calcium ion concentration and viscosity of fish meat slurries made from the ground pollack meat in accordance with the present invention.

DETAILED DESCRIPTION OF THE INVENTION

Figure 1:
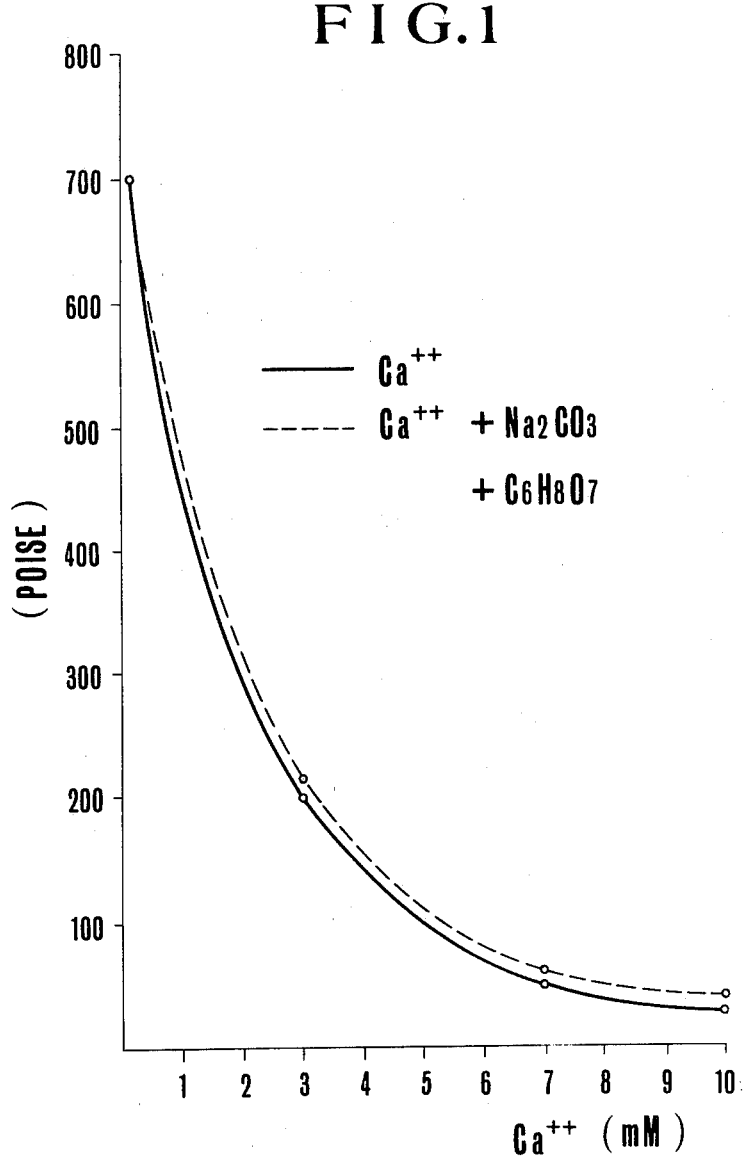

The term "KAMABOKO-forming property" as used in the present specification, to the property by which fish meat powder, when blended with suitable amounts of water and table salt and then heated at 90° C. for 30 minutes, exhibits the same jelly strength as does fresh fish meat when it is similarly blended and heated.

In view of the object of this invention, the fish meat to be used in the present invention is desired to be as fresh as possible. Specifically, fish meat which has been removed by an ordinary method from the bodies of freshly caught fish or from the bodies of frozen fish and then bleached with water is used. For the purpose of precluding possible denaturation of the muscular proteins which make up the fish meat, it is permissible to add to this meat 5 to 10% by weight of a polyhydric alcohol (such as sorbitol) or oligosaccharide (such as sucrose) and a polyphosphate (such as sodium pyrophosphate), for example, prior to conversion of the meat to a slurry. Also, in the case of a frozen ground fish meat, it is desirable to use one which has been prepared from fresh fish meat and which has incorporated therein a polyphosphate, sorbitol, sucrose, etc. as a freshness preservative.

Conversion of such fish meat or frozen ground fish meat into a slurry is accomplished by adding to the fish meat divalent metal or such as calcium ions and magnesium ions in a water-soluble form and kneading them in a grinding machine such as a colloid mill so as to give a solids content of 7-10%. Where frozen ground fish meat is used as the raw material, frozen blocks thereof are finely minced with a cutter prior to conversion into a slurry as described above. The amount in which the divalent metal ions are added is proper within a range in which the added ions make up a concentration of 6 to 10 mM based on the water present in the fish meat slurry. Insofar as these ions are added in an amount falling within the above-mentioned range, they will serve the purpose of sufficiently decreasing the slurry viscosity without adversely effecting the taste.

Carbonic acid, citric acid and other similar weak acids are proper sources of polyvalent ions for sequestering the divalent metal ions. In this invention, these weak acids are used in the form of buffer solutions with pH values approximating neutrality such as, for example, aqueous solutions of sodium carbonate-hydrochloric acid, sodium carbonate-citric acid and sodium citrate-citric acid. Polyvalent ions of any weak acid in the form of a buffer solution can be used provided they have a high capacity for sequestration. Polyvalent anions, which at low temperatures form an insoluble substance in combination with divalent metal ions, however, are undesirable due to the fact that they prevent the divalent metal ions from lowering the viscosity of the fish meat slurry and at the same time, cause the pH value thereof to decline. The polyvalent anions of a weak acid to be used in the present invention, therefore, should be selected so that at low temperatures they will not form an insoluble substance in conjunction with divalent metal ions, but will give a sparingly soluble divalent metal salt during spray-drying.

Polyphosphates are unsuitable for the above purpose, in spite of their high capacity for sequestering divalent metal as calcium ions and magnesium ions, because they form insoluble calcium salts, magnesium salts, etc. at the low temperatures at which the fish meat slurry is prepared Further, since the polyvalent ions of the weak acid are used in the present invention, in the form of a buffer solution with a pH value approximating neutrality, the fish meat slurry thus obtained will retain its pH value in the neighborhood of neutrality. Thus, the slurry is protected from possible denaturation due to changes in the pH value of the muscular proteins in the fish meat.

The viscosity reductions in the fish meat slurries of the present invention will be explained with reference to the accompanying drawings.

FIG. 1 illustrates the viscosity declines achieved, in the preparation of fish meat slurries from a frozen ground pollack meat available on the market, by using calcium ions in combination with weak-acid anions for their sequestration thereof in the form of a sodium carbonate-citric acid buffer solutions. The effect of the use of calcium ions alone is also illustrated conjunction with the weak-acid anions. Each fish meat slurry was adjusted to a solids content of 8% and a pH value of 7.2 and thereafter, tested for viscosity at 5° C.

Figure 2:
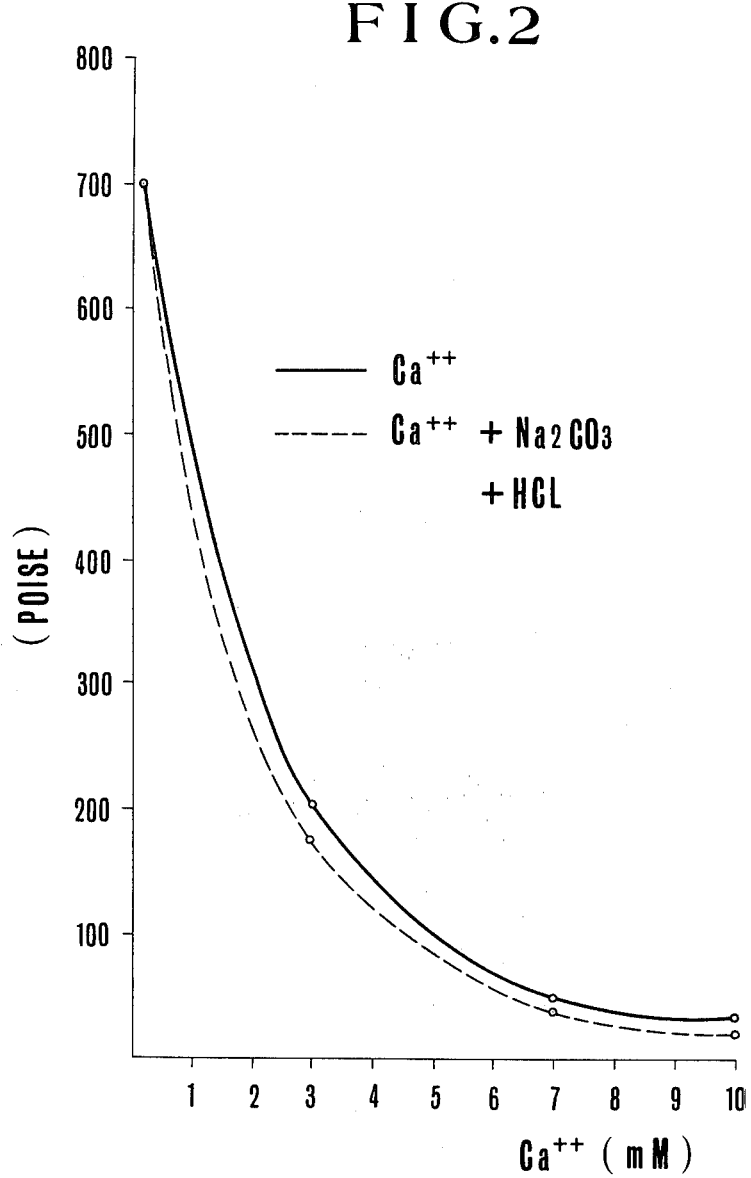

In a manner similar to FIG. 1, FIG. 2 and FIG. 3 illustrate viscosity changes for fish meat slurries which were prepared by using polyvalent weak-acid anions in the form of sodium carbonate-hydrochloric acid and of sodium citrate-citric acid solutions.

It is clearly seen from FIGS. 1 through 3, that the viscosity decline observed for the fish meat slurries containing calcium ions and polyvalent weak-acid anions in combination is substantially the same as that observed for those slurries containing calcium ions alone.

The fish meat powders obtained from slurries containing polyvalent weak-acid anion sequestered divalent metal ions in accordance with this invention were tested for their KAMABOKO-forming property in terms of jelly strength. The results are shown in the following table.

TABLE

| Substances used in the preparation of fish meat slurry | | Viscosity of the fish meat slurry (poise) | Jelly strength of fish meat powder (g) |
|---|---|---|---|
| $Ca^{++}$ + | Sodium citrate-citric acid | 70 | 310 |
| $Ca^{++}$ + | Sodium carbonate-hydrochloric acid | 25 | 300 |
| $Ca^{++}$ + | Sodium carbonate-citric acid | 40 | 315 |
| $Mg^{++}$ + | Sodium citrate-citric acid | 50 | 310 |
| $Mg^{++}$ + | Sodium carbonate-hydrochloric acid | 25 | 305 |
| $Mg^{++}$ + | Sodium carbonate-citric acid | 35 | 310 |

TABLE-continued

| Substances used in the preparation of fish meat slurry | | Viscosity of the fish meat slurry (poise) | Jelly strength of fish meat powder (g) |
|---|---|---|---|
| $Ca^{++}$ + | Neutralizing agent | 30 | 330 |
| $Mg^{++}$ + | Neutralizing agent | 30 | 325 |

Note:
In the case of fish meat powders prepared using $Ca^{++}$ and $Mg^{++}$ in combination with a neutralizing agent, fish meat slurries were first prepared in the presence of $Ca^{++}$ or $Mg^{++}$ and then, to the fish powders obtained by spray-drying the slurries, sodium pyrophosphate was added to effect sequestration of $Ca^{++}$ or $Mg^{++}$.
For measurement of jelly strength, each fish meat powder (having a water content of 6%) was kneaded with 3.7 kg of water per kg of the powder, then kneaded with table salt (added in an amount 2.7% by weight) by an ordinary method and finally kneaded (in the presence of about 7% by weight of added starch), packed in a casing, heated at 90° C for 30 minutes to produce KAMABOKO and tested for jelly strength by use of an OKADA type jelly strength gauge.

As is evident from the preceding table, the fish meat powder obtained in accordance with the present invention can be used as the raw material for paste products such as KAMABOKO without requiring addition of any neutralizing agent.

The fish meat slurries of the present invention are prepared as described above, using inexpensive, readily available divalent metal ions such as calcium ions or magnesium ions in conjunction with polyvalent weak-acid anions such as carbonate or citrate. The fish meat powder prepared from such a slurry can be utilized in its unaltered form as the raw material for the manufacture of paste products.

EXAMPLE

Fish meat powder was prepared from a commercially available frozen ground fish meat by adding calcium ions in an amount to give a calcium ion concentration of 10 mM based on the water content of the fish meat slurry to be obtained, further adding an amount of sodium carbonate-citric acid necessary to sequester the calcium ions, finely mincing the frozen meat to form a fish meat slurry with reduced viscosity, adjusting the slurry to a solids content of 8% and spray-drying this slurry.

By use of a cutter, 50 kg of frozen ground pollack meat having a solids content of 20% and pH 7.3 was finely minced. Separately, 170 g of calcium chloride dehydrate, 197 g of sodium carbonate decahydrate and 65 of citric acid monohydrate were dissolved in 75 kg of water. The resultant solution and, the finely minced ground meat were homogeneously mixed. The liquid mixture thus obtained was converted into a slurry by means of a colloid mill. The fish meat slurry thus formed was found to have a pH of 7.1 and a 40 poises of viscosity.

The fish meat slurry prepared as described above was filtered and subsequently spray dried. One kg of the fish meat powder (6% water content) thus obtained was kneaded in 3.7 g of water, then, in accordance with the conventional method, salt kneading (in the presence of 2.7% by weight of table salt) and finally kneaded (in the presence of 7% by weight of starch). The resulting paste was then packed in a casing and heated (at 90° C. for 30 minutes) to produce KAMABOKO. When the KAMABOKO was measured for its jelly strength by an OKADA type jelly strength gauge, it was found to have a jelly strength of 315 g. A control KAMABOKO manufactured by an ordinary method directly from the same frozen ground fish meat was found to have a jelly strength of 340 g.

What is claimed is:

1. A method of preparing fish meat powder capable of forming KAMABOKO comprising:

forming a fish meat slurry in a buffer solution containing (1) divalent metal ions and (2) sodium carbonate and citric acid or sodium citrate and citric acid, said buffer solution having an approximately neutral pH; the anions of said buffer solution being present in an amount sufficient to sequester said divalent metal ions but do not form an insoluble substance during preparation of the slurry; and subsequently spray-drying said fish meat slurry wherein the sequestered divalent metal ions form a sparingly soluble divalent metal salt during the spray drying.

2. The method of claim 1 wherein said fish meat slurry is formed by mincing fresh fish meat.

3. The method of claim 1 wherein said fish meat slurry is obtained by mincing a frozen ground fish paste.

4. The method of claim 1 wherein said divalent metal ions are calcium ions or magnesium ions.

5. The method of claim 1 wherein said divalent metal ions are present in the amount of 6–10 mM, based on the water content of said fish meat slurry.

* * * * *